US005834856A

United States Patent [19]
Tavallaei et al.

[11] Patent Number: 5,834,856
[45] Date of Patent: Nov. 10, 1998

[54] COMPUTER SYSTEM COMPRISING A METHOD AND APPARATUS FOR PERIODIC TESTING OF REDUNDANT DEVICES

[75] Inventors: Siamak Tavallaei, Spring; Jeffrey S. Autor, Houston; An T. Vu, Spring; John S. Lacombe, Tomball, all of Tex.

[73] Assignee: Compaq Computer Corporation, Houston, Tex.

[21] Appl. No.: 912,877

[22] Filed: Aug. 15, 1997

[51] Int. Cl.$^6$ ...................................................... G06F 11/16
[52] U.S. Cl. ........................... 307/64; 307/131; 364/180; 395/180; 395/184.01
[58] Field of Search .................................. 307/31, 64, 66, 307/116, 125, 131; 364/551.01, 552, 184; 395/184.01, 180; 361/695

[56] References Cited

U.S. PATENT DOCUMENTS

| | | | |
|---|---|---|---|
| 4,400,626 | 8/1983 | Lacy | 307/66 |
| 4,707,796 | 11/1987 | Calabro et al. | 364/552 |
| 5,313,625 | 5/1994 | Hess et al. | 395/184.01 |
| 5,526,289 | 6/1996 | Dinh et al. | 364/557 |
| 5,546,272 | 8/1996 | Moss et al. | 361/695 |
| 5,574,667 | 11/1996 | Dinh et al. | 364/557 |
| 5,631,800 | 5/1997 | Jin et al. | 361/103 |
| 5,634,038 | 5/1997 | Saitoh | 395/490 |
| 5,638,895 | 6/1997 | Dodson | 165/121 |

OTHER PUBLICATIONS

The I$^2$C–Bus and how touse it (including specification); *Philips Semiconductor*; Apr. 1995; pp. 1/24.
"Remote 8–bit I/O expander for I$^2$C–Bus" Data Sheet; *Philips Semiconductor*; Apr. 2, 1997; pp. 1–23.
Farnsworth, C.; "Low Power Implementation of an I$^2$C–Bus Expander"; http://maveric0.uwaterloo.ca/amulet/publications/thesis farnsworth94msc.html; Jun. 16, 1997; one page.
Collins, Andy; "Interfacing TMS370 Microcontrollers to I$^2$C–Bus ICs"; Logikos; wysiwyg:/lll/http://www.logikos.com/tms370.html; Jun. 16, 1977; pp.1–6.
"I$^2$C–Bus Expander" Application Note AN036; *Philips Semiconductors Programmable Logic Devices*; Oct. 1993; 22 pages.
"The PCI (Peripheral Component Interconnect) Bus"; Aug. 6, 1997; pci.txt at www.gl.umbc.edu; pp. 1–7.
"Re: What's the difference between locks and semaphores?"; Jim Barton (jmb@patton.wpd.sgi.com) Jan. 2, 1991; Accessed Jun. 16, 1997; http://www/sgi.com/Archive/comp.sys.sgi/1991/Jan/0006.html.
"Internal Data Structures, 6.4.3 Semaphores" Basic Concepts; Accessed Jul. 11, 1997; http://linux.www.db.erau.edu/LPG/node47.html.
"The PCI Local Bus"; Accessed Jul. 27, 1 997; http://www.rns.com/whats new/wh pci.html.
"PCI Bus Technology"Information Brief; *IBM Personal Computing Solutions*; Accessed Jul. 27, 1997; http://www.us.pc.ibm.com/infobrf/ibpci.html.
"PCI164 Screamer Functional Diagram" Microway; Accessed Jul. 27, 1997; http://www.microway.com/block.html.
"The PCI (Peripheral Component Interconnect) Local Bus" description of PCI Bus; Accessed Jul. 27, 1997; http://www.sundance.com/pci.html.
"CMOS Bus Switches Provide Zero Delay Bus Communication"Application Note AN–09; *Quality Semiconductor Inc.*; date unknown; pp.1–9.
"High–Performance CMOS Analog 8–Channel Switch" QS4A05Q Preliminary; *Quality Semiconductor Inc.*; May 30, 1996; pp. 1–7.
"Quickswitch®Converts TTL Logic to Hot Plug Operation" Application Note AN–13; *Quality Semiconductor Inc.*; date unknown; pp. 1–5.

*Primary Examiner*—Jeffrey A. Gaffin
*Assistant Examiner*—Albert W. Paladini
*Attorney, Agent, or Firm*—Jenkens & Gilchrist

[57] ABSTRACT

A computer system or computer server system having redundant devices that are periodically checked in order to determine whether the redundant devices would be operational if the primary devices failed. The primary and redundant devices are in electrical communication with a controller circuit which, in turn, is responsive to a microprocessor and/or the computer's operating system. The primary and redundant devices can be hot-pluggable so that the computer system does not need to be powered down when and if the primary or redundant devices need to be replaced.

16 Claims, 4 Drawing Sheets

COMPUTER SYSTEM COMPRISING A METHOD AND APPARATUS FOR PERIODIC TESTING OF REDUNDANT DEVICES

BACKGROUND OF THE INVENTION

1. Field of the Invention

The present invention relates generally to a computer system that has primary and redundant devices. More particularly, the present invention relates to a computer system that can actively check the health of dormant redundant devices by temporarily turning the redundant devices on and checking if they would be operational if the primary devices failed.

2. Description of Related Art

Networks serve the purpose of connecting many different personal computers, workstations, or terminals to each other, and to host computers, printers, file servers etc., so that expensive computing assets, programs, files and other data may be shared among many users. In a network utilizing a client/server architecture, the client (personal computer or workstation) is the requesting machine and the server is the supplying machine, both of which are connected via the network. The network could be a local area network (LAN) or wide area network (WAN). This is in contrast to early network systems that utilized a mainframe with dedicated terminals.

In a client/server network, the client contains the user interface and may perform some or all of the application processing and as mentioned above can include personal computers or workstations. The server in a client/server network can be high-speed microcomputers or minicomputers and in the case of a high-end computer server can include multiple processors and mass data storage such as multiple hard drives and multiple CD-ROM drives. A database server maintains the databases and processes requests from the client to extract data from or update a database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations. The mass storage and multi-processing capabilities provided by current client/server network systems (i.e. high-end servers) permit a wide range of essential services and functions to be provided to the user.

As can be appreciated, many businesses are highly dependent upon the availability and functionality of their client/server network systems which permit essential network services and functions to be carried out. As client/server network systems become increasingly essential to the everyday operations of businesses, additional steps need to be taken in the design and construction of the server in the client/server network system to ensure continuous availability of the server system to the clients. That is to say, in the design and construction of a server, steps need to be taken to ensure that the server can be operated with little or no down time.

Server reliability and serviceability are two valuable design aspects which help ensure that a server will operate with little or no down time. The modularity of components within a server has been recognized as an important design consideration that helps ensure that the down time of a server will be minimized. The modules can be removed from the server and examined for operability or other purposes in a much easier manner than permanently mounted fixtures. Modular devices and subsystems can also be readily replaced and installed to maintain the operational status of the server.

Removable modular components include disc drives power supplies, fan assemblies and printed circuit boards. As referenced above, the removability of modular components allows for better overall serviceability of the computer system. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server required turning the power to the server off before any modular components or printed circuit boards were removed from or added to the chassis or support frame of the server. Recent innovations have addressed the desirability to insert and remove modular components and printed cards from the chassis of the server when the server is electrically connected and operational. Modular components that can be connected to a computer system, while the computer system is on, are referred to as "hot-pluggable" modular components.

Hot-pluggable components include storage or disc drives, drive cages, fan assemblies, power supplies, system I/O boards, control boards, processor boards, and other electronic subassemblies. The hot removability of these server components allows better overall serviceability of the computer system which is a distinct advantage to both the user and the maintenance technician.

Component redundancy has also been recognized as an important design consideration in ensuring that a server will operate with little or no down time. Component redundancy helps ensure that at least one of the redundant components is operable. With component redundancy, at least two components are provided. Either component can perform the same function. If one of the components fails, the operation switches over to the redundant component. When at least one of the redundant components is operable, continued operation of the computer system is possible even if other redundant components fail. To further enhance reliability and serviceability, redundant components have been made hot pluggable.

Reconfiguration of the server system can also be accomplished with upgradable modular components. This is accomplished by the addition or substitution of components having different circuits disposed thereupon. When components are redundant and hot pluggable, reconfiguration of the server is often possible without taking the server offline.

Another important design aspect with redundant and hot pluggable components is to ensure and maintain a safe working environment while the server is operating and being repaired or upgraded. Therefore the exposure of hot connectors and contact must be kept to a minimum.

Steps are similarly also taken in the design and construction of the server system to ensure that the server system is readily serviceable such that when the client/server network system is serviced the down time can be minimized. In existing client/server network system it is often difficult to obtain important data corresponding to a component failure in order to facilitate the quick serviceability of the server. Therefore, the more information that can be readily provided to locate a defective component or problem with the server, the less time the server is down.

A computer server is an exemplary computer system. A computer server is typically utilized when a group of discretely-positioned computer systems are connected together in a networked fashion. The computer server, and files contained therein, is selectively accessible by any of the computers in the networked connection with the computer server. When access to the files stored at the computer server is essential to perform a particular service or function, it is imperative that the computer servers be online and available so that the files stored therein can be accessed.

A user interface for a computer system provides selected information relating to the computer system in human perceptible form to a user of the computer system. A user interface sometimes also permits a user of the computer system to input commands to the computer system. A computer keyboard and a video display terminal are exemplary components of the user interfaces conventionally used in conjunction with a computer system.

Referring again to redundant devices, in a system that has redundant or secondary devices it is important for a user to know that the redundant devices would be operable if the primary devices failed or were removed from the computer system.

In the past, redundant devices have been connected to a system so that if the primary device failed then the redundant device would be turned on. For example, if the primary device is a system cooling fan and it failed, a secondary cooling fan would begin to operate. A problem with the prior systems is that until the primary fan failed, it was unknown if the redundant fan was operational. There existed no way of testing the redundant fan without turning off the computer system and removing the redundant fan to test it.

Thus, it would be an advantage to have a computer system that was adapted to check the, "health" and operability of redundant devices. It would be a further advantage to have a computer system that could report to the operating system "OS" the health of each redundant device in the system so that the operating system could inform a user of the computer system that the redundant devices are OK or that one or more of the redundant devices would not be operational if its associated primary device failed.

It is in the light of this background information to computer systems and redundant devices that significant improvements and inventions have evolved in the area of computer systems having redundant devices.

SUMMARY OF THE INVENTION

In summary, an exemplary embodiment of the present invention will include a computer system. The computer system comprises a primary device and one or more redundant devices. The primary device and the redundant devices are in communication with a device controller. The device controller is adapted to control the primary device and check the operability of the primary device. The device controller is also adapted to control the redundant devices to be normally off while the primary device is operating, and to become operational at predetermined intervals and for predetermined amounts of time in order to determine whether the redundant device could be operational if the primary device failed.

The primary and redundant devices could be a variety of components found within a computer system. Such devices include, but are not limited to, fan assemblies, power supplies, power modules, I/O boards, microprocessor boards, disk controllers, bus controllers, and microprocessors.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF A PRESENTLY PREFERRED EXEMPLARY EMBODIMENTS

Figure 1:
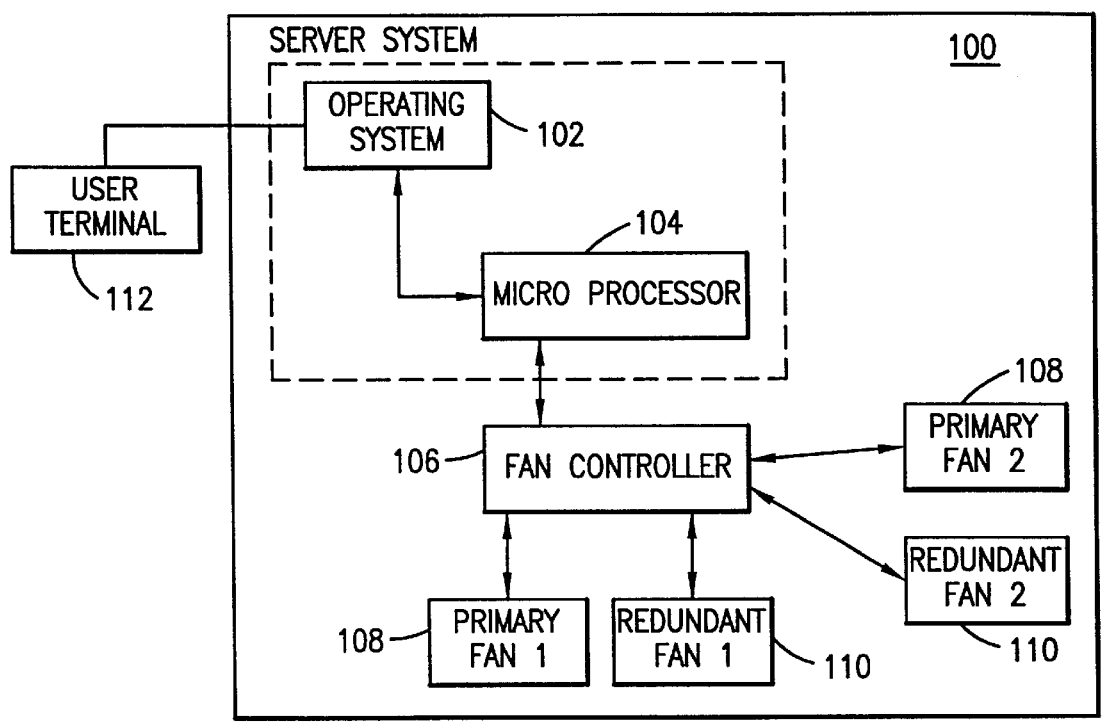
FIG. 1 depicts a block diagram of an exemplary computer system comprising an apparatus for periodic testing of redundant devices.

The scientific and business world has become more and more dependant on the support of computer systems. Computer systems are being used to control the environments of buildings, control the workings of assembly lines, banking transactions, document production, manufacturing research and development, managerial operations, information systems, the list goes on and on. When a computer system fails in today's business environment the results can be temporarily catastrophic for the business. Computer users may be unable to perform the wide variety of tasks that need the support of a computer system when a computer system fails.

In order to make a computer system more reliable, the designers of computer systems have placed redundant devices and subsystems in computer systems. The computer systems have primary devices and sub-systems that are normally operational and redundant devices that would be switched on when and if the primary devices fail. The redundant devices normally stay dormant or off until the primary devices are not operational. The drawback of this prior system is that one is not sure if the redundant device will work until the time that the primary device fails.

Other computer systems that have redundant devices or sub-systems require that both the primary devices and the redundant or secondary devices always be on and operating. If the primary device fails in this type of prior system, the secondary device is already operating. The drawbacks of this situation is that power consumption is high, the system produces a high level of audible noise, and that the devices are being used and worn at all times causing the redundant device to potentially break down shortly after the primary device fails.

In the exemplary embodiments of the present invention there exists a primary device and a redundant device. Both primary and redundant devices are monitored and controlled by a microcontroller circuit. The microcontroller circuit, allows the primary device to be operational. The primary device is constantly monitored by the microcontroller to make sure that it is functioning properly. Furthermore, the microcontroller monitors whether a redundant device is present.

From time to time, the microcontroller will turn the redundant device on, give the redundant device time to stabilize, and then monitor the redundant device to make sure that it would be operational if the primary device failed. When turning the redundant device on, the microcontroller can be programmed to either turn the primary device off or to leave the primary device operational. In a preferred embodiment the primary device is turned off while the redundant device is being tested for operability.

The microcontroller is in electrical communication with a microprocessor that is responsive to the operating system of the computer system. Status information which includes the "health" of the redundant device can be relayed from the microcontroller to the operating system and in turn provided to the user of the computer system. The operating system is used by the user to set the time frame for testing the redundant devices in the computer system. Thus, redundant devices could be tested, for example, every day, every week, or every second.

The preferred exemplary embodiment of the present computer system which includes an apparatus and method for periodically testing a redundant device is a computer server system. Referring to FIG. 1 an exemplary computer server 100 is shown. The operating system 102 and a microprocessor board 104 perform and handle a majority of the functions of the server system 100. The microprocessor board 104 may have a plurality of microprocessors on board and may further comprise a plurality of microprocessor boards connected to each other via a backplane or specialized communication busses.

A microcontroller board, the fan controller 106, is preferably programmable to monitor multiple sets of primary devices 108 and redundant devices 110. Here the fan controller 106 monitors two sets of primary and redundant fans 108, 110. One set being primary fan one and redundant fan one; and the other set being primary fan two and redundant fan two.

In the exemplary server system 100 only the primary fans 108 need to be running in order to cool the computer system 100. While the primary fan is operating the microcontroller 106 monitors the current consumed by the primary fan 108 to determine if there is an over current or under current condition. The primary fan may also provide spin fault signals to the fan controller 106.

At time intervals set by a user in the operating system 102, the fan controller 106 will be instructed by the operating system to check the redundant fan 110 to make sure that the redundant fan would be operational if the primary fan 108 failed. The fan controller 106 essentially turns off the primary fan 108 and turns on the redundant fan 110 only if a redundant fan 110 is present. In the preferred embodiment this is achieved by switching "sleep" bits in the firmware of the fan controller 106. The redundant fan 110 is allowed to accelerate to a steady state speed. The microcontroller 106 then monitors whether the redundant fan is in an over current, under current or no-spin detect condition. The microcontroller 106 informs the operating system 102 whether the redundant fan is fully operational or not and then turns the redundant fan 110 off. The primary fan 108 is then turned back on.

If the operating system 102 was informed by the fan controller 106 that the redundant fan 110 is not operational, the user could then be informed, by the operating system 102 via the user terminal 112, which redundant fan is non-operational so that the fan can be replaced.

If the fan controller 106 finds a faulty fan, whether it be a primary fan or secondary fan, it will immediately switch the faulty fan off and turn on the other fan.

Figure 2:
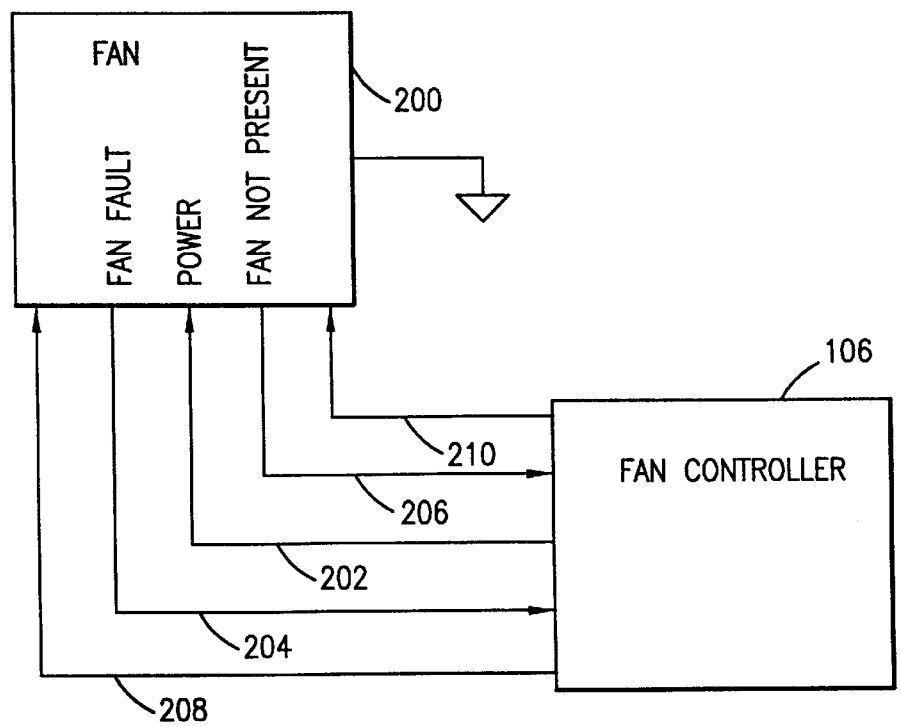
FIG. 2 depicts the preferred connections between an exemplary fan and an exemplary fan controller board.

FIG. 2 depicts an exemplary fan assembly ("fan") connected to an exemplary fan controller card 106. The fan assembly 200 has connections that may include, power 202, fault detect 204, fan-not-present 206, fan LED 208, and fan speed control 210. The fan controller card 106 can detect the amount of current the fan is drawing and determine whether the fan 200 is operating properly or in an over or under current state. Furthermore the fault detect line 204 provides a signal from the fan 200 to the fan controller board 106 indicating whether or not the fan 200 is spinning. Thus, the fan controller card can determine the health or operability of each fan that it is connected to. The fan-not-present signal 206 will indicate whether or not a fan 200 is connected to the fan controller 106 at the location.

Figure 3:
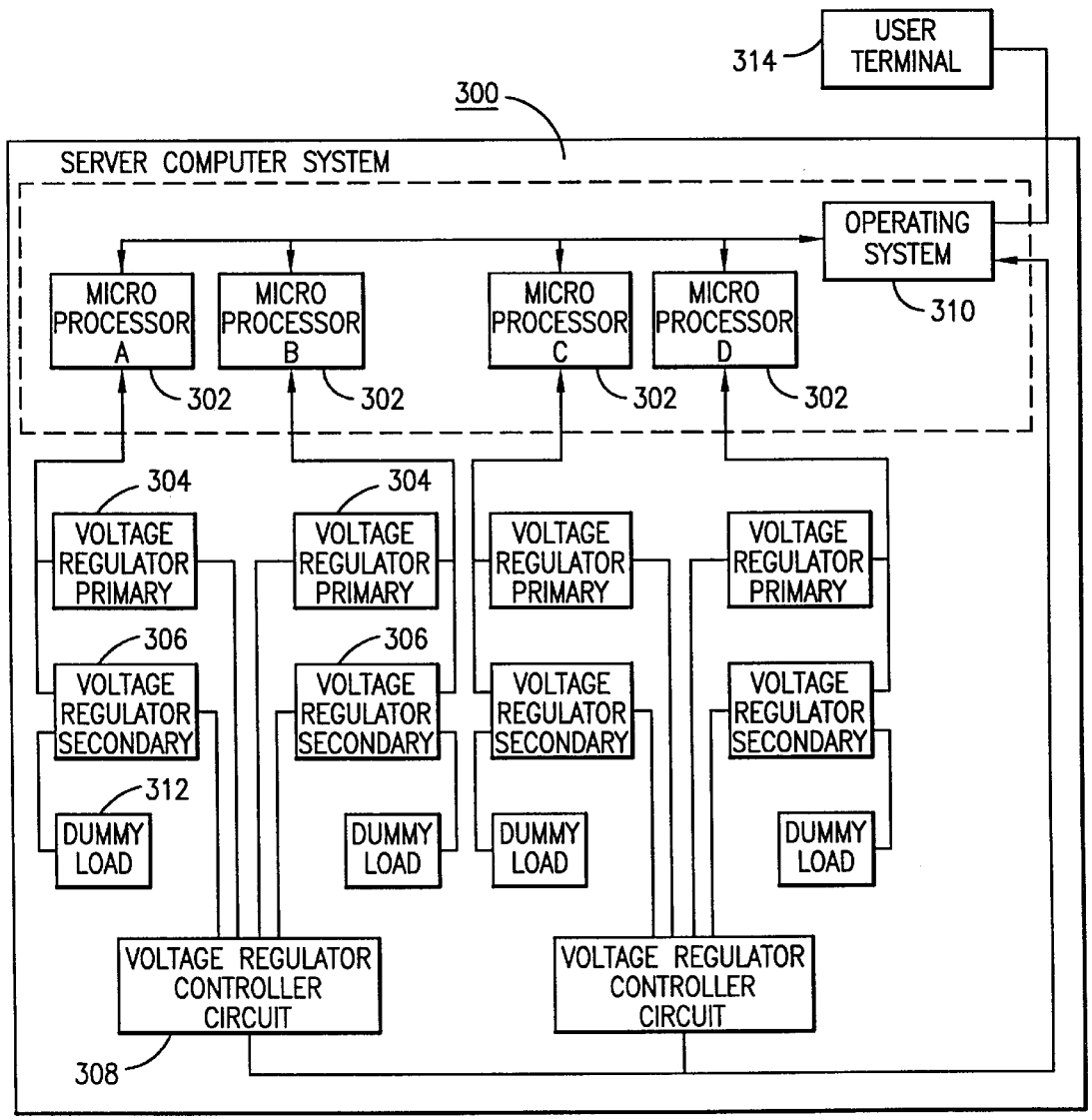
FIG. 3 depicts a block diagram of a second exemplary computer system comprising apparatus for periodic testing of redundant devices.

FIG. 3 depicts a second exemplary embodiment of a computer system 300 having the capability to periodically check a redundant device to determine whether it is operational. Here the exemplary server 300 comprises a plurality of microprocessors 302 A-D. Each microprocessor 302 requires its own voltage regulator to regulate, for example, 12 volt and 5 volt supply voltages. It is understood the importance of providing the proper regulated power to each microprocessor 302. Thus, each processor has associated therewith a primary voltage regulator module 304 and a redundant voltage regulator module 306.

A voltage regulator controller circuit 308 is connected to the primary and redundant voltage regulator modules 304, 306. Under normal conditions the voltage regulator controller 308 instructs the primary voltage regulation circuit 304 to provide regulated power to the microprocessor 302. The controller 308 monitors the output of the primary voltage regulator 304 to make sure that the voltage provided to the microprocessors 302 is within a predetermined voltage window.

The voltage regulator controller circuit 308 preferable contains a microcontroller which can be polled or can provide interrupt signals to other circuits related to the main microprocessors 302. The operating system 310, via the microprocessors 302 and related circuitry (not shown), can communicate with the voltage regulator controller circuit 308 and potentially set the voltage window or current window to be provided by the primary or secondary voltage regulators 304, 306.

From time to time the voltage regulator controller circuit 308 may turn on the secondary voltage regulator 306 and check to make sure that it would be operational if the primary voltage regulator 304 were to fail. The time interval between checking the secondary voltage regulator 306 circuit can be set by the user of the system by using the operating system 310 and the user terminal 314.

Unlike the first exemplary embodiment, described above, wherein the primary fan is preferably turned off while the redundant fan is turned on and checked by the fan controller, this second exemplary embodiment would require the primary voltage regulator 304 to remain on while the secondary voltage regulator's 306 "health" is checked by the voltage regulator controller circuit 308. It is critical that power to the microprocessors 302 is not interrupted. Thus, it would not be advantageous to turn on the secondary voltage regulator 306 and turn off the primary voltage regulator 308 only to find that the secondary voltage regulator 306 is faulty in some aspect.

Thus, it may be necessary for the secondary voltage regulation circuit 306 to be connected to a dummy load 312 while it is being tested by the voltage regulator controller circuit. This can be accomplished via switching transistors (not shown) that are controlled by the voltage regulator controller circuit 308.

If the primary voltage regulator circuit 304 fails the voltage regulator controller circuit 308 can turn on the secondary voltage regulator circuit 306 and switch its output so that the secondary regulator circuit 306 is powering the microprocessor 302 instead of the dummy load 312.

Figure 4:
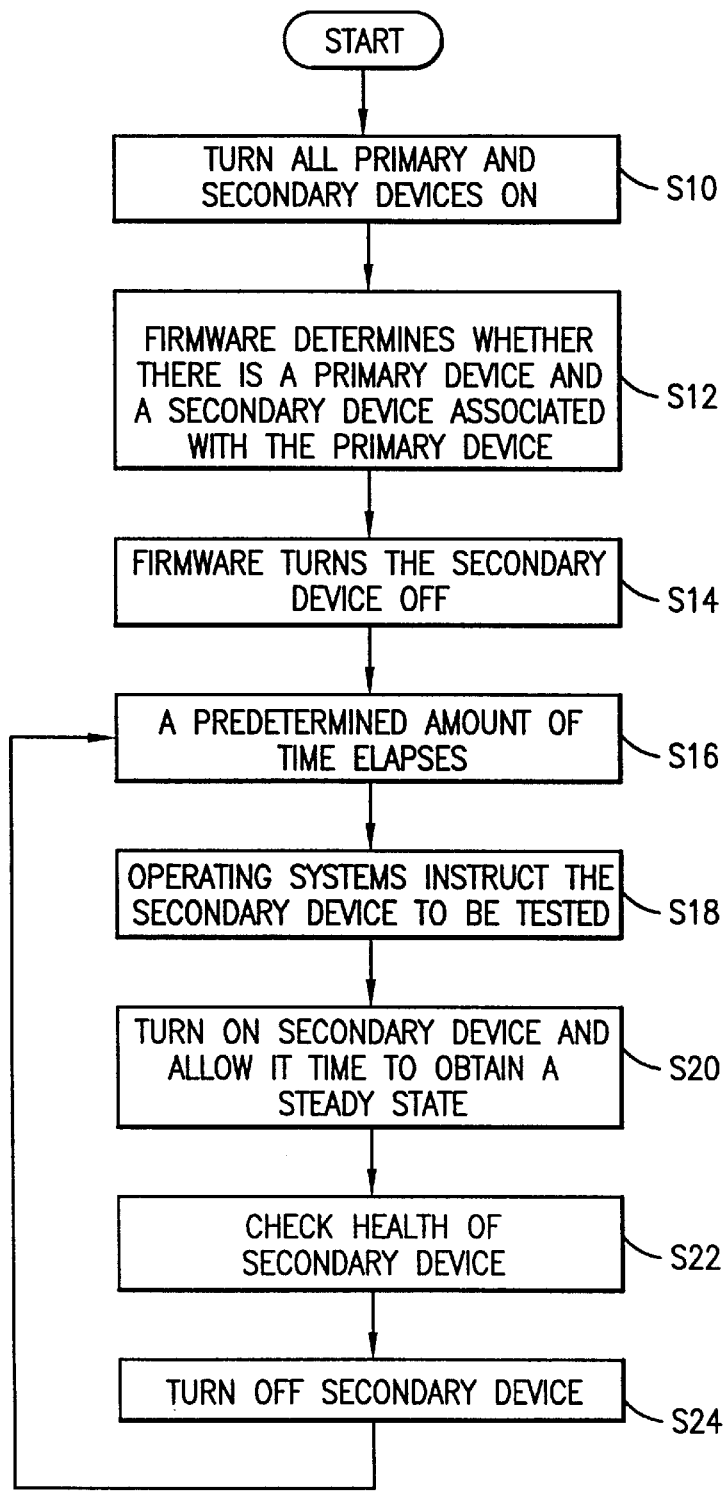
FIG. 4 provides a flow chart of an exemplary method for periodically testing redundant devices in a computer system.

FIG. 4 depicts a flow chart covering a method of periodically testing redundant devices as discussed above in the two exemplary embodiments. When the computer system is turned on the operating system and/or firmware requires that all the primary and secondary devices be turned on S10. The firmware determines if there are primary devices connected to the system and if there are secondary devices connected to the system. The system further determines which secondary devices are associated with which primary devices S12.

The system firmware then turns off all the secondary devices S14. The system operates using the primary devices. The controllers associated with the primary devices constantly check the primary devices to make sure they are operating correctly. If one of the primary devices were to fail, the device controller would turn on the secondary device so that the system would not have to be turned off. The operating system would inform a user of the system that a primary device failed so that the user could replace the primary device before the secondary device fails.

Returning to the flow chart, after a predetermined amount of time elapses S16, the operating system of the computer tells the device controller to check the secondary (redundant) device to make sure that it would be operable if the primary device failed S18. The device controller will either power down the primary device and power up the secondary device (either simultaneously or in an overlapping fashion) or keep the primary device operating while the secondary device is powered up. The device controller will then wait a short period of time to allow the secondary device to achieve a steady state S20.

The operating system then instructs the device controller to test the secondary device and determine if it is operating within predetermined specifications S22. If the secondary device is operating within specifications, it is turned off. If the secondary device is not operating within the predetermined specifications the operating system is informed that the secondary device would not be operational if the primary device failed. In turn, the operating system informs the user so that the user can replace or repair the secondary device prior to the primary device failing. The secondary device is then turned off S24.

After turning off the secondary device the operating system waits a predetermined amount of time before checking the operability of the secondary device again S16. This method repeats until the computer system is turned off.

In an exemplary embodiment of the present invention each of the primary and secondary devices are "hot pluggable". Thus, if a primary or secondary devices are found to be faulty by the operating system or the device controller, they can be removed and replaced without having to power down the computer system.

In the preferred exemplary embodiment wherein the device controller is a fan controller circuit and the primary and secondary devices are cooling fans for a server system there are four hot-pluggable fans connected to a fan controller circuit. The four fans are arranged in two groups; Fan 1 and Fan 2, positioned to propel air in series in order to cool a microprocessor board; Fan 3 and Fan 4 are also grouped to propel air in series and cool a variety of I/O boards in the computer server system. Normally one fan from each group is active, while the other fan from the said group freewheels.

Each hot-pluggable fan receives +12.25 volts for powering the fan from a fan controller circuit an provides a fan-fault signal and a fan-not-present signal to the fan controller board. The fan-fault signal indicates whether the fan is spinning or not when power is applied to the fan. The fan-not-present signal indicates whether a hot-pluggable fan is installed in a position.

The fan controller board of the exemplary embodiment can control the speed of the four fans. Power and a fan speed control signal are provided to the fan assembly 200 of the exemplary embodiment. Circuitry within the fan assembly 200 varies the speed of the fan blades based on the received signals. Another technique available could be to vary the power provided to each fan. The power can be varied either by oscillating the power on and off or by varying the voltage amplitude to the fans. The current used by the fans is detected by the fan controller in order to determine an over current or undercurrent fault. The fan controller also may receive temperature information from sensors located in the server computer or from the operating system. If an over temperature condition exists the fan controller can turn on all the fans, both primary and redundant, and operate them at full speed.

Figure 5:
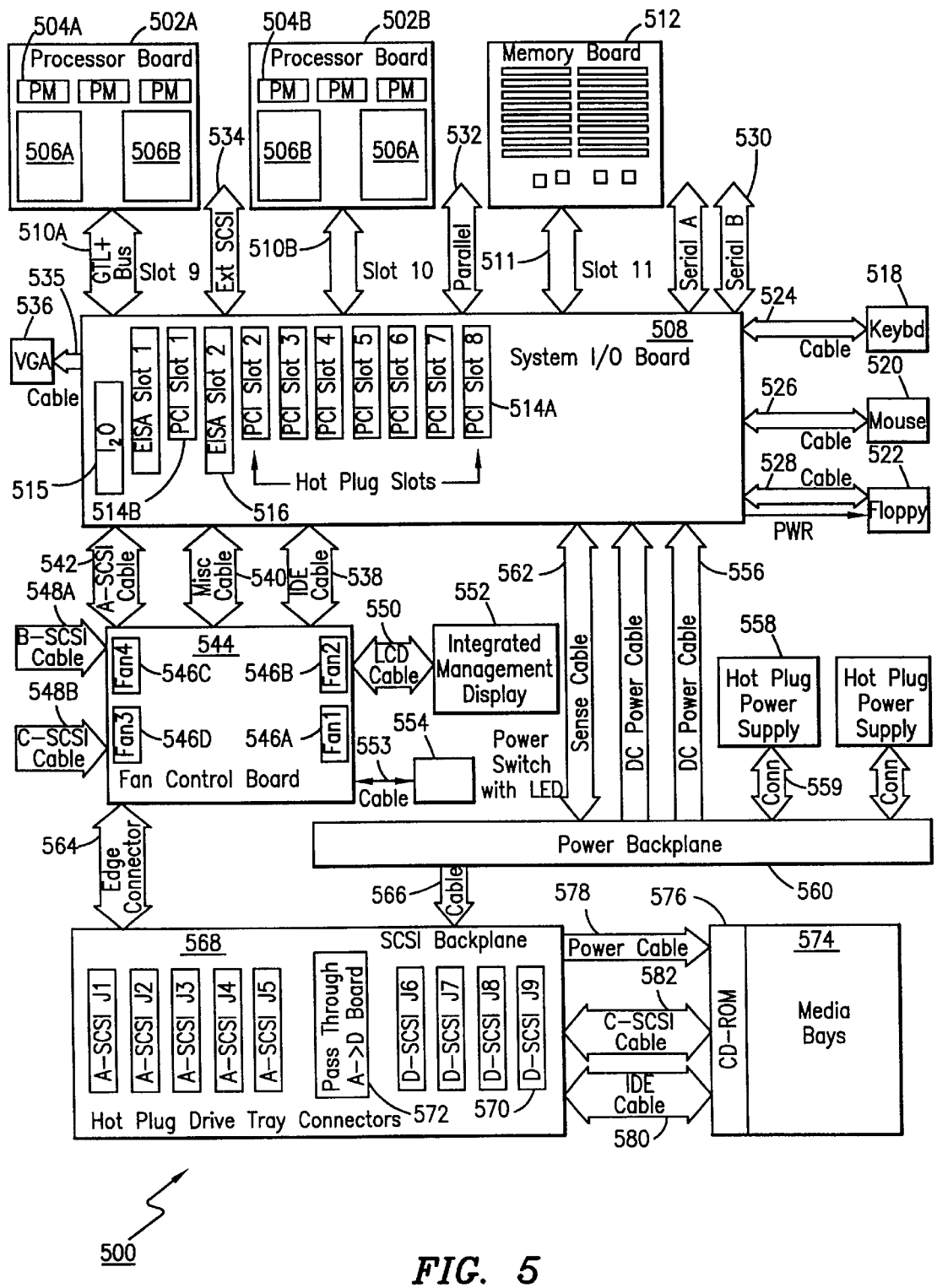
FIG. 5 is a block diagram of an exemplary computer system.

The fan controller circuit preferably communicates with the microprocessors and the operating system via an $I^2C$ bus. Referring now to FIG. 5, there is shown a board-level block diagram of a presently preferred exemplary computer server system 500 in which the teachings of the present invention may be beneficially employed. It should be understood by those skilled in the art that while the exemplary computer system 500 is preferably organized as a zero downtime, highly available, high-end server system, the present invention may be practiced in virtually all types of computers.

The exemplary computer system 500 may comprise a plurality of processor boards, for example, processor boards 502A and 502B, each of which, in turn, may include at least one processor such as, for example, processors 506A and 506B, respectively. The processor boards 502A and 502B may also include, respectively, a plurality of power modules. For example, power modules 504A and 504B are shown herein. The power modules may be redundant devices in accordance with the exemplary embodiments of the present invention.

Each of the processor boards 502A and 502B is connected to a system board 508 via a suitable bus connector or slot, for example, bus connector slots 510A and 510B, respectively. In the exemplary computer system 500, the presently preferred bus connector slots are compatible to be operable with the Gunning Transistor Logic (GTL) bus protocol. Furthermore, as will be seen hereinbelow, the system board 508 in the exemplary embodiment also contains a plurality of input/output (I/O) subsystems. Accordingly, the system board 508 may also be interchangeably referred to as the system I/O board in the following Detailed Description.

Continuing to refer to FIG. 5, a memory board 512 is also coupled to the system board 508 through a memory connection slot 511. In the exemplary computer system 500, the memory board 512 may comprise several dual in-line memory modules (DIMMs) having known sizes, for example, 8 MB, 16 MB, 32 MB, 64 MB, 128 MB, and 256 MB. As can be appreciated by those skilled in the art, the memory provided with the memory board 512 may be organized in any known fashion.

The exemplary system board 508 comprises a plurality of expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 500 contributes to rendering the system 500 a "zero downtime" system with high availability. In the exemplary computer system 500, the plurality of expansion slots comprises those that may be operable with the Peripheral Component Interconnect (PCI) bus type (for example, slots 514A and 514B) as well as those slots that are compatible with the Extended Industry Standard Architecture (EISA) bus type (for example, slot 516). It should be appreciated that either categories of the expansion slots may be provided with hot-pluggability. The system board 508 may additionally comprise serial port connections, for example, serial connector 530, parallel port connection, for example, parallel connector 532, and a connector 534 compatible with the Small Computer System Interface (SCSI) bus type.

Still continuing to refer to FIG. 5, the system board 508 is coupled to a host of input and output devices via cables, for example, a keyboard 518 with cable 524, a pointing device 520 with cable 526, a flexible disk drive 522 with 528, and a monitor 536 with cable 535. As can be seen, a separate power connection path 521 is also provided between the flexible disk drive 522 and the system board 508.

The exemplary system board 508 may also comprise an "intelligent I/O" bus connector 515 for accelerating the performance of selected PCI-compatible expansion slots. A fan control board 544 is coupled to the system board 508 through a SCSI cable 542, a miscellaneous cable 540 and an Integrated Drive Electronics (IDE) cable. The fan control board 544 comprises a plurality of fan connectors, for example, fan connector 546A–546D, which fan connectors are used for coupling hot-pluggable fans. The fan control board 544 may be provided with additional SCSI-compatible cables, for example, cables 548A and 548B, a display cable 550 coupled to an integrated management display (IMD) unit 552, and a power switch cable 553 coupled to a power switch 554.

The miscellaneous cable connector 540, which joins the fan control board 544 with the system board 508, preferably contains signals generated by the IMD unit 552, various interlock signals provided by an interlock cabling system (not shown) interconnecting various boards, temperature signals, fan control signals, audio signals et cetera.

The system board 508 of the exemplary computer system 500 is coupled to a power backplane 560 via a sense cable 562 and at least one DC power cable 556. At least one hot plug power supply unit 558 is connected to the power backplane 560 through a hot plug power connector 559. Another exemplary embodiment of the present invention would be to have a primary and redundant power supply which operate in a similar fashion to the first and/or second exemplary embodiments described above.

Both the fan control board 544 and the power backplane 560 are coupled to a SCSI backplane 568 via an edge connector 564 and a power-SCSI backplane cable 566, respectively. The SCSI backplane comprises a plurality of SCSI drive tray connectors, for example tray connector 570. In the exemplary computer system 500, the SCSI drive tray connectors are also provided with the hot plug capability in order to enhance the high availability aspect thereof. A media power cable 578 connects the SCSI backplane 568 to a media bay 574 and CD-ROM drive 576. A media SCSI cable 582 and an IDE cable 580 are also disposed between the SCSI backplane and the CD-ROM/media bay 576/574.

By incorporating the exemplary embodiments of the present periodic redundant testing devices into, for example, a computer server system the entire computer server obtains a higher level of fault resiliency than prior devices. On the one hand, the computer system can detect a fault in a primary device and then smoothly recover from the fault by turning off the faulty device and turning on a secondary redundant device. Furthermore, the present invention actively and periodically tests the secondary devices for potential faults so that a failure can be detected before the secondary device is needed. As a result the totality of the computer system becomes more reliable and dependable.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A computer system comprising:

an operating system, a microcontroller in communication with said operating system;

a primary device in data communication with said microcontroller, said microcontroller controlling said primary device and determining whether said primary device is operating properly;

a redundant device in communication with said microcontroller, said microcontroller turning on said redundant device at predetermined time intervals for a predetermined amount of time in order to determine if said redundant device would be operational if said primary device failed.

2. The computer system of claim 1, wherein said primary device is a fan and said redundant device is a fan.

3. The computer system of claim 1, wherein said primary device is a power supply and said redundant device is a power supply.

4. The computer system of claim 1, wherein said microcontroller monitors the amount of current used by said primary device and monitors the amount of current used by said redundant device when said redundant device is on.

5. The computer system of claim 1, wherein said microcontroller provides the operating system data related to whether said redundant device would be operable if said primary device became inoperable.

6. The computer system of claim 1, wherein said microcontroller turns off said primary device at approximately the same time that said redundant device is turned on.

7. The computer system of claim 1, wherein said microcontroller leaves the primary device on when said redundant device is turned on.

8. The computer system of claim 1, wherein said primary device and said secondary device is hot-pluggable.

9. The computer system of claim 1, wherein said microcontroller waits a first predetermined amount of time after said redundant device is turned on and then tests the operability of said redundant device.

10. A computer system comprising:

a primary fan for providing air flow through said computer system;

a redundant fan for providing air flow through said computer system when said primary fan is inoperable;

a fan controller circuit, in data communication with said primary fan and said secondary fan, for controlling said primary fan and for turning on, testing, and turning off said redundant fan at predetermined time intervals in order to determine whether said redundant fan would be operational if said primary fan became inoperable;

an operating system, in data communication with said fan controller circuit, for informing a user of said computer system of a status of said primary fan and said secondary fan.

11. The computer system of claim 10, further comprising an operating system in communication with said fan controller circuit, said fan controller circuit passing data to said operating system, said data indicating whether said redundant fan would be operational if said primary fan become inoperable.

12. The computer system of claim 10, further comprising:

a primary power supply for powering said computer system;

a redundant power supply for powering said computer system when said primary power supply is inoperable;

a microcontroller, in communication with said primary power supply and said redundant power supply, for monitoring whether said primary power supply is operational and for turning on and testing said redundant power supply at predetermined time intervals to determine whether said redundant power supply would be operational if said primary power supply become inoperable.

13. The computer system of claim 12, further comprising an operating system in communication with said microcontroller, said microcontroller circuit passing data to said operating system, said data indicating whether said redundant power supply would be operational if said primary power supply became inoperable.

14. The computer system of claim 10, wherein said computer system is a server system.

15. A method for determining whether a redundant device in a computer system would be operational if a primary device failed comprising the steps of:

powering-up a computer system;

turning on a primary device;

monitoring a functionality aspect of said primary device;

turning on a secondary device at predetermined intervals for a predetermined amount of time and monitoring said functionality aspect of said secondary device in order to determine if said secondary device would be operational if said primary device was not operational.

16. The method of claim 15, wherein said primary device is turned off when said secondary device is turned on.

\* \* \* \* \*